US011196905B2

(12) United States Patent
Onaka et al.

(10) Patent No.: US 11,196,905 B2
(45) Date of Patent: Dec. 7, 2021

(54) IMAGE-CAPTURING APPARATUS FOR REDUCING A NUMBER OF COMPONENTS OF AN OPTICAL ELEMENT SWITCHING MECHANISM

(71) Applicant: CANON KABUSHIKI KAISHA, Tokyo (JP)

(72) Inventors: Tomoya Onaka, Tokyo (JP); Daisuke Fujiwara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/843,283

(22) Filed: Apr. 8, 2020

(65) Prior Publication Data

US 2020/0329183 A1    Oct. 15, 2020

(30) Foreign Application Priority Data

Apr. 10, 2019    (JP) .............................. JP2019-074542
May 13, 2019    (JP) .............................. JP2019-090883
(Continued)

(51) Int. Cl.
*H04N 5/225*    (2006.01)
*G02B 7/02*    (2021.01)
(Continued)

(52) U.S. Cl.
CPC ............. *H04N 5/2254* (2013.01); *G02B 7/02* (2013.01); *G02B 7/021* (2013.01); *G02B 7/08* (2013.01);
(Continued)

(58) Field of Classification Search
CPC ....... H04N 5/2254; G03B 17/12; G02B 7/006
See application file for complete search history.

(56) References Cited

U.S. PATENT DOCUMENTS

| 4,090,069 A | 5/1978 | Lisfeld et al. |
| 4,827,348 A | 5/1989 | Ernest et al. |
| (Continued) | | |

FOREIGN PATENT DOCUMENTS

| CN | 1964436 A | 5/2007 |
| CN | 101236280 A | 8/2008 |
| (Continued) | | |

OTHER PUBLICATIONS

Japanese Office Action dated Nov. 24, 2020, for Corresponding Japanese Application No. 2019-163542.
(Continued)

*Primary Examiner* — Christopher K Peterson
(74) *Attorney, Agent, or Firm* — Carter, DeLuca & Farrell LLP (57) ABSTRACT

An image-capturing apparatus comprises a fixed portion configured to fix an image-capturing lens, the fixed portion having an opening portion on its side surface, and a holding base configured to be inserted through the opening portion in a direction orthogonal to an optical axis of the image-capturing lens, wherein the holding base holds, slidably with respect to an orthogonal plane which is orthogonal to the optical axis, an optical element holding frame which holds an optical element, the fixed portion includes a first sliding portion in an inside of the fixed portion formed through the opening portion, and the optical element holding frame includes a second sliding portion which slidably contacts the first sliding portion.

8 Claims, 13 Drawing Sheets

(30) Foreign Application Priority Data

May 27, 2019 (JP) .............................. JP2019-098375
Sep. 9, 2019 (JP) .............................. JP2019-163542

(51) Int. Cl.
| | |
|---|---|
| G02B 7/08 | (2021.01) |
| G03B 17/12 | (2021.01) |
| G02B 5/20 | (2006.01) |
| G03B 17/02 | (2021.01) |
| G03B 11/00 | (2021.01) |
| G02B 7/00 | (2021.01) |

(52) U.S. Cl.
CPC ........... *G03B 17/12* (2013.01); *H04N 5/2252* (2013.01); *H04N 5/2253* (2013.01); *G02B 5/20* (2013.01); *G03B 2205/0053* (2013.01)

(56) References Cited

U.S. PATENT DOCUMENTS

| | | | |
|---|---|---|---|
| 6,137,958 | A | 10/2000 | Toyoda |
| 2006/0077284 | A1 | 4/2006 | Kurosawa |
| 2006/0268232 | A1 | 11/2006 | Jin |
| 2008/0106805 | A1 | 5/2008 | Aiba |
| 2008/0143868 | A1 | 6/2008 | Tsuchiya et al. |
| 2010/0111516 | A1 | 5/2010 | Basho |
| 2010/0172036 | A1 | 7/2010 | Qian |
| 2011/0090578 | A1 | 4/2011 | Yoshimura |
| 2012/0257097 | A1 | 10/2012 | Takai |
| 2012/0320202 | A1 | 12/2012 | Qian |
| 2013/0148222 | A1 | 6/2013 | Wang et al. |
| 2015/0002730 | A1* | 1/2015 | Shi ...................... H04N 5/2252 348/361 |
| 2015/0042818 | A1 | 2/2015 | Wada et al. |
| 2015/0070563 | A1 | 3/2015 | Sperber |
| 2016/0006958 | A1 | 1/2016 | Iwamatsu |
| 2018/0172943 | A1* | 6/2018 | Lee ...................... G03B 17/12 |
| 2019/0076007 | A1 | 3/2019 | Higashiyama et al. |
| 2019/0187404 | A1 | 6/2019 | Onaka |
| 2020/0029780 | A1 | 1/2020 | Woo et al. |
| 2020/0077027 | A1 | 3/2020 | Onaka |
| 2020/0329180 | A1 | 10/2020 | Fujiwara et al. |

FOREIGN PATENT DOCUMENTS

| | | |
|---|---|---|
| CN | 101246300 A | 8/2008 |
| CN | 101986182 A | 3/2011 |
| CN | 102012610 A | 4/2011 |
| CN | 102405439 A | 4/2012 |
| CN | 102577351 A | 7/2012 |
| CN | 102636938 A | 8/2012 |
| CN | 202631926 U | 12/2012 |
| CN | 103268050 A | 8/2013 |
| CN | 203405615 U | 1/2014 |
| CN | 203502715 U | 3/2014 |
| CN | 203535359 U | 4/2014 |
| CN | 105301871 A | 2/2016 |
| CN | 108241245 A | 7/2018 |
| CN | 208479813 U | 2/2019 |
| CN | 109425949 A | 3/2019 |
| EP | 3722872 A1 | 10/2020 |
| JP | H04163429 A | 6/1992 |
| JP | 2002330320 A | 11/2002 |
| JP | 2006074654 A | 3/2006 |
| JP | 2006258969 A | 9/2006 |
| JP | 2012173523 A | 9/2012 |
| JP | 2016015617 A | 1/2016 |
| JP | 2016122074 A | 7/2016 |
| JP | 2018074224 A | 5/2018 |
| TW | 200827900 A | 7/2008 |
| WO | 0026700 A1 | 5/2000 |

OTHER PUBLICATIONS

Extended European Search Report issued by the European Patent Office dated Aug. 27, 2020 in corresponding EP Application No. 20168643.

Extended European Search Report issued by the European Patent Office dated Aug. 13, 2020 in corresponding EP Application No. 20168642.5.

Extended European Search Report issued by the European Patent Office dated Aug. 7, 2020 in corresponding EP Application No. 20168641.7.

Office Action issued by the U.S. Patent and Trademark Office dated Apr. 1, 2021 in corresponding U.S. Appl. No. 16/843,258.

Notification of First Office Action issued by the China National Intellectual Property Administration dated Aug. 26, 2021 in corresponding CN Patent Application No. 202010267507.9, with English translation.

Notification of the First Office Action issued by the China National Intellectual Property Administration dated Sep. 3, 2021 in corresponding CN Patent Application No. 202010267468.2, with English translation.

Notification of the First Office Action issued by the China National Intellectual Property Administration dated Aug. 31, 2021 in corresponding CN Patent Application No. 202010267465.9, with English translation.

* cited by examiner

IMAGE-CAPTURING APPARATUS FOR REDUCING A NUMBER OF COMPONENTS OF AN OPTICAL ELEMENT SWITCHING MECHANISM

BACKGROUND OF THE INVENTION

Field of the Invention

The present invention relates to an image-capturing apparatus, and more particularly to an image-capturing apparatus provided with a mechanism for inserting an optical element such as an optical filter into an optical path and removing the optical element from the optical path.

Description of the Related Art

Conventionally, in order to obtain an image using infrared rays in an image capturing at night or in a dark place, an image-capturing apparatus such as a monitoring camera has been provided with an optical filter switching mechanism for removing an optical filter for blocking infrared rays (hereinafter, IRCF) from an optical path by using a driver such as a motor.

For example, Japanese Patent Application Laid-Open No. ("JP") H4-163429 discloses an aperture unit as a mechanism for sliding blades by an actuator having a lever. An optical filter frame that holds an optical filter is fixed to the aperture unit, and the aperture unit is incorporated from an opening portion provided on a side surface of a lens barrel.

In addition, an optical filter switching unit which has an optical filter switching mechanism for sliding an optical filter frame that holds an optical filter into an optical path by sandwiching the optical filter frame by two members of front and rear fixing members is known.

However, in a configuration in which these conventional techniques are combined, in a configuration in which an optical element switching unit is incorporated into a lens barrel, an optical element holding frame to be driven in the optical element switching unit is sandwiched by two components of front and rear fixed components. For this reason, there is a problem that the number of components of an optical element switching mechanism is large and a size of the optical element switching mechanism is increased in an optical axis direction.

SUMMARY OF THE INVENTION

The present invention is directed to reducing the number of components of an optical element switching mechanism and reducing a thickness of the optical element switching mechanism in a configuration in which an optical element switching unit is incorporated into a lens barrel.

An image-capturing apparatus according to one aspect of the present invention includes a fixed portion configured to fix an image-capturing lens, the fixed portion having an opening portion on its side surface, and a holding base configured to be inserted through the opening portion in a direction orthogonal to an optical axis of the image-capturing lens, wherein the holding base holds, slidably with respect to an orthogonal plane which is orthogonal to the optical axis, an optical element holding frame which holds an optical element, the fixed portion includes a first sliding portion in an inside of the fixed portion formed through the opening portion, and the optical element holding frame includes a second sliding portion which slidably contacts the first sliding portion.

Further features of the present invention will become apparent from the following description of exemplary embodiments with reference to the attached drawings.

DESCRIPTION OF THE EMBODIMENTS

Hereinafter, an embodiment for implementing the present invention will be described in detail with reference to the accompanying drawings.

Figure 3:
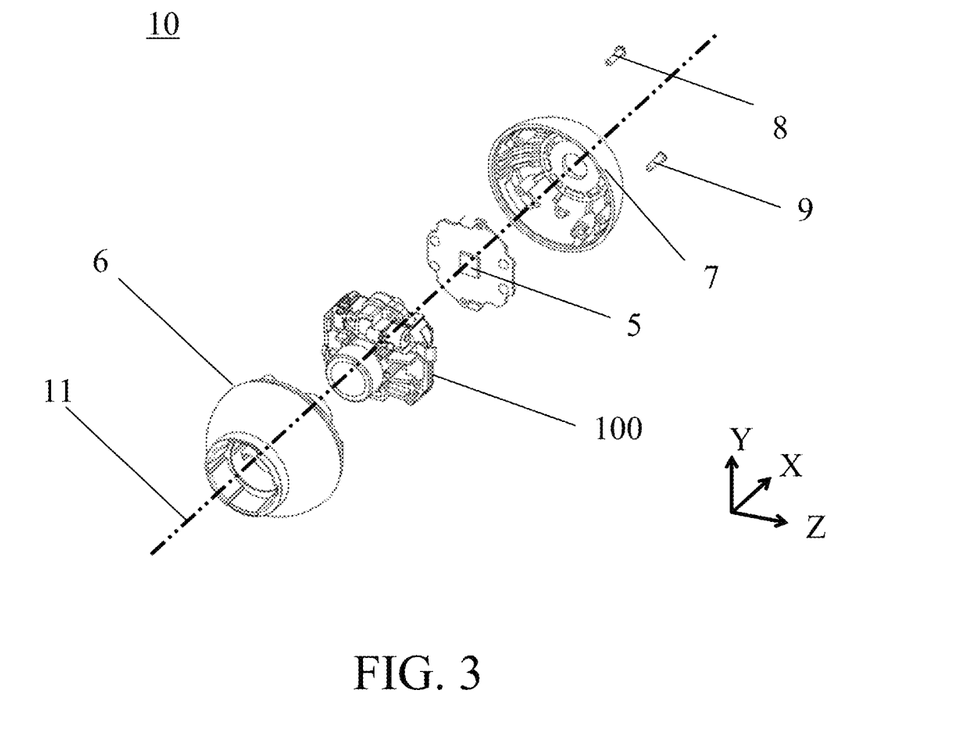
FIG. 3 is an exploded perspective view of the image-capturing unit 10.

Hereinafter, a network camera connected to a network will be described as an example of an image-capturing apparatus. As shown in FIG. 3, a direction of an optical axis 11 from a rear cover 7 to a front cover 6 is defined as a −X direction, and a direction of the optical axis 11 from the front cover 6 to the rear cover 7 is defined as a +X direction. Y and Z directions and their signs are defined by Y and Z axes in a lens holder shown in FIG. 8A.

The embodiment described below is an example as a means for realizing the present invention, and should be appropriately modified or changed depending on a configuration of an apparatus to which the present invention is applied and various conditions. The present invention is not limited to the following embodiment.

Embodiment

In this embodiment, a configuration of the network camera 1 (image-capturing apparatus) will be described.

Figure 1:
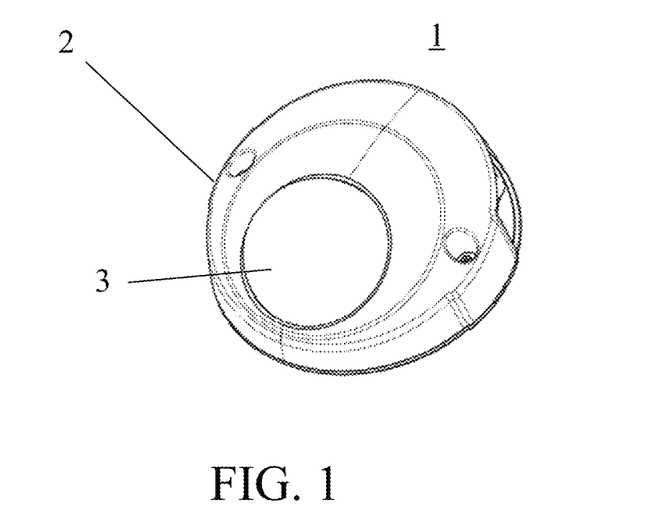
FIG. 1 is an external view of a network camera 1.
Figure 2:
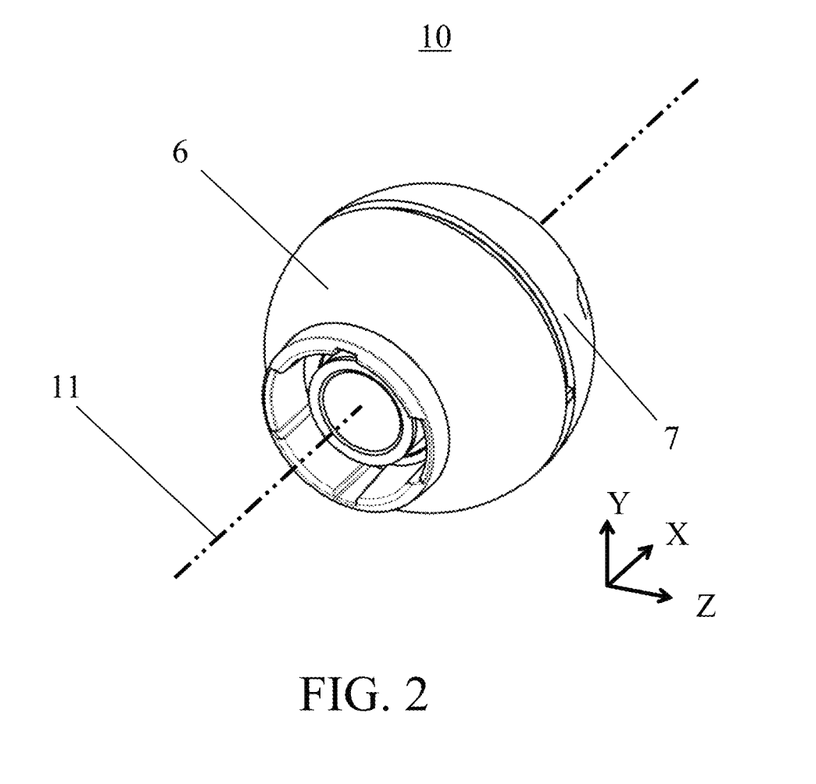
FIG. 2 is an external view of an image-capturing unit 10 mounted on the network camera 1.

FIG. 1 is an external view of the network camera 1, and FIG. 2 is an external view of an image-capturing unit 10 mounted on the network camera 1. FIG. 3 is an exploded perspective view of the image-capturing unit 10.

The network camera 1 shown in FIG. 1 includes a fixed cover 2, a dome cover 3, a pan/tilt/rotation unit (not shown), and the image-capturing unit 10 shown in FIG. 2. The pan/tilt/rotation unit and the image-capturing unit 10 are disposed inside the dome cover 3. Light transmitted through the dome cover 3 passes through the image-capturing unit 10 and forms an image by being received by an image sensor 5 of the image-capturing unit 10 shown in FIG. 3. As a result, the network camera 1 can capture the image.

The image-capturing unit 10 shown in FIG. 2 is composed of a front cover 6, a rear cover 7, the image sensor 5, and a lens barrel 100, as shown in FIG. 3. The lens barrel 100 and the image sensor 5 are fixed by an adhesive or a screw, and the front cover 6 and the rear cover 7 sandwich the lens barrel 100 and the image sensor 5 which are integrated inside. The front cover 6 and the rear cover 7 are fixed to each other by screws 8 and 9.

Figure 4:
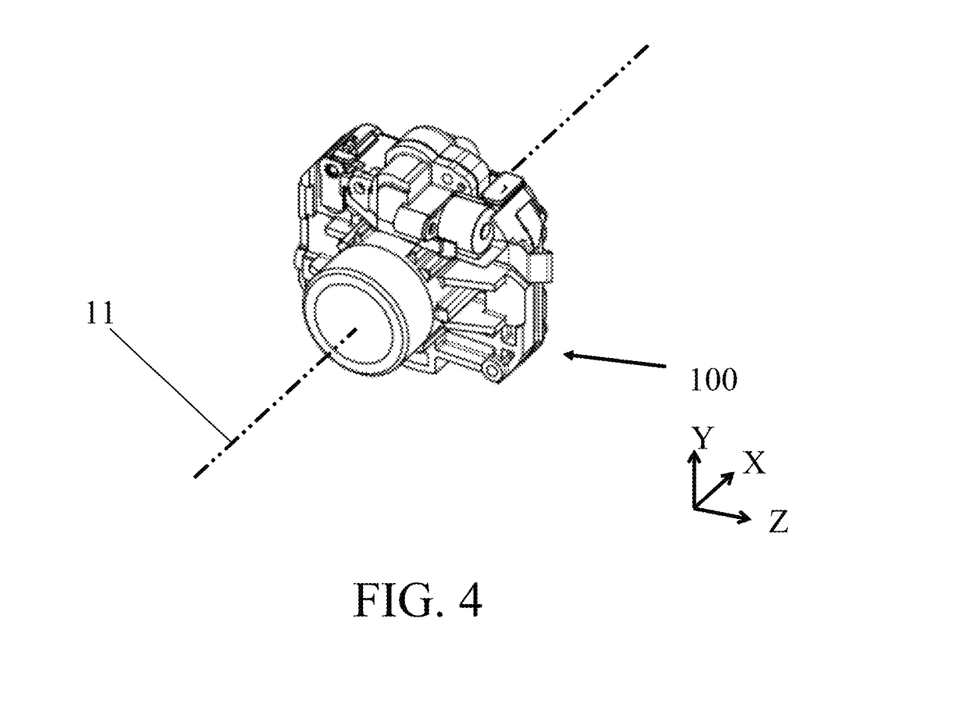
FIG. 4 is a perspective view of a lens barrel 100.
Figure 5:
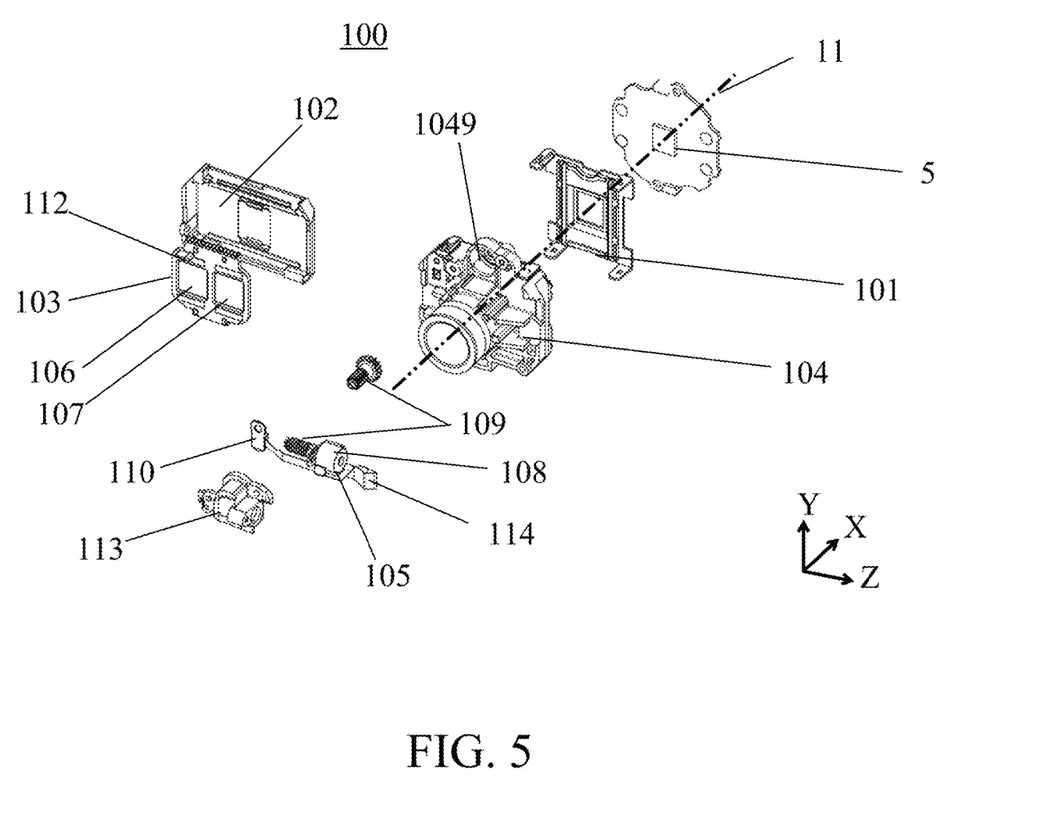
FIG. 5 is an exploded perspective view of the lens barrel 100.

FIG. 4 is a perspective view of the lens barrel 100 (the lens barrel 100 alone may be referred to as an image-capturing apparatus), and FIG. 5 is an exploded perspective view of the lens barrel 100. As shown in FIG. 5, the lens barrel 100 shown in FIG. 4 is composed of an image sensor protection rubber 101, a filter base 102 (holding base), a filter holder 103 (optical element holding frame), a lens holder 104 (fixed portion), and an actuator portion 105.

In this configuration, as shown in FIG. 5, the filter holder 103 is placed on the filter base 102 from the −X direction, and these two components are inserted into an opening portion 1041 of the lens holder 104, which will be described later, from the −Z direction with respect to the lens holder 104. The actuator portion 105 is attached to an actuator attachment portion 1049 of the lens holder 104 from the −X direction, and the image sensor protection rubber 101 and the image sensor 5 are attached to the lens holder 104.

The actuator 105 shown in FIG. 5 is composed of a motor 108 and a gear train 109, and the gear train 109 is engaged with a gear meshing portion 1031 of the filter holder 103 described later. Thus, a driving force of the motor 108 is transmitted to the filter holder 103. A gear cover 113 covers the gear train 109. Also, by changing a voltage to the motor 108 and changing a rotation direction, the filter holder 103 slides in the Z direction and is inserted into and removed from an optical path.

The actuator 105 has a photo-interrupter 110, and when the IRCF 106 retracts in the −Z direction, light is shielded by a light-shielding portion 112 attached to the filter holder 103. When the IRCF 106 is on the optical axis 11, light is incident on the photo-interrupter 110. This makes it possible to detect whether or not the IRCF 106 is on the optical axis 11. Here, the motor 108 and the photo-interrupter 110 are electrically connected to a main board (not shown) by a flexible printed board 114.

Figure 6A:
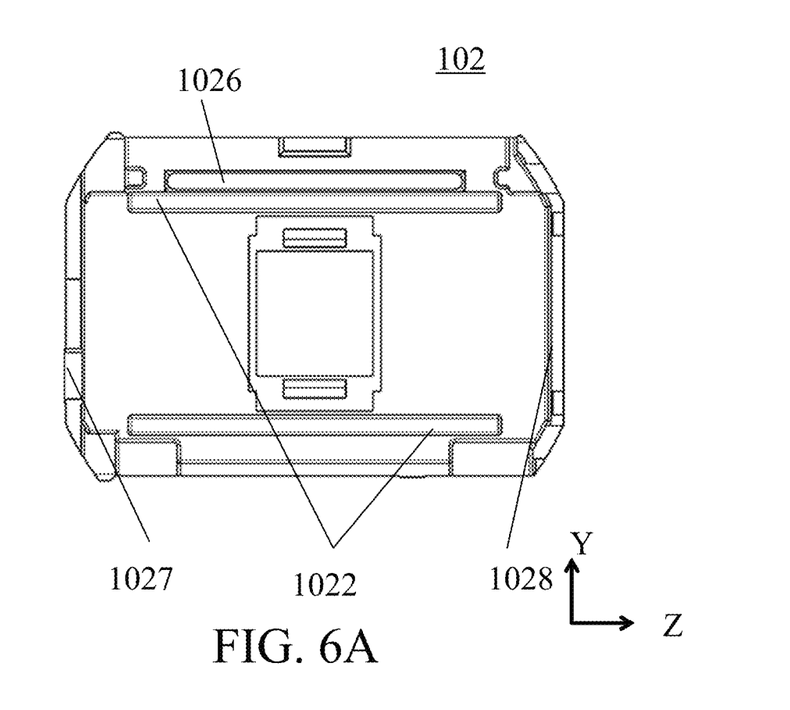
FIG. 6A is an external view of a filter base 102 viewed from a −X direction.
Figure 6B:
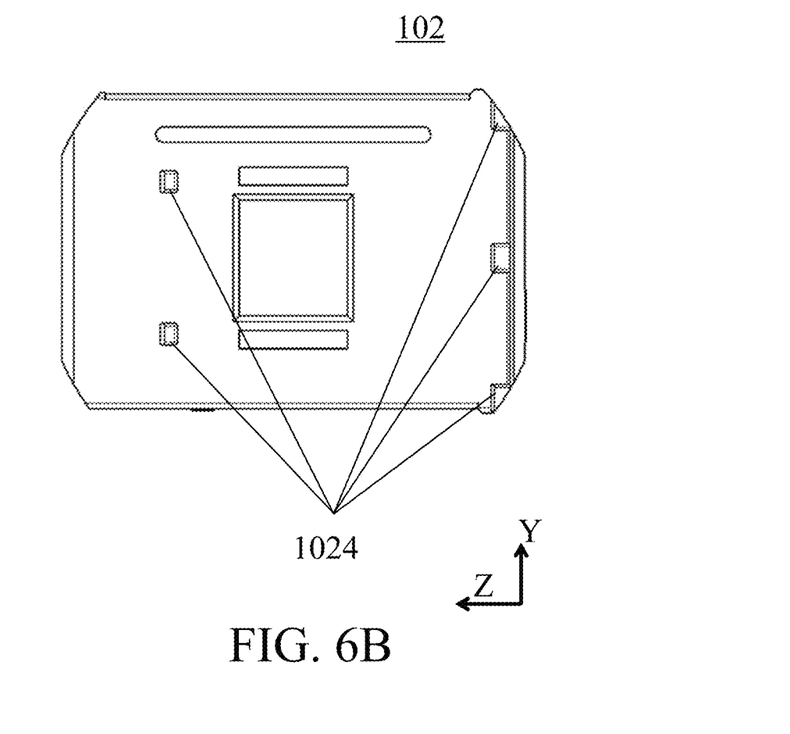
FIG. 6B is an external view of the filter base 102 viewed from a +X direction.

FIG. 6A is an external view of the filter base 102 viewed from the −X direction, and FIG. 6B is an external view of the filter base 102 viewed from the +X direction. The filter base 102 has a guide portion 1026 and a sliding surface 1022, which guide the filter holder 103 so that the filter holder 103 can slide in the Z direction of the lens barrel 100. The filter base 102 also has a contacting surface 1024 and side walls 1027 and 1028.

Figure 7A:
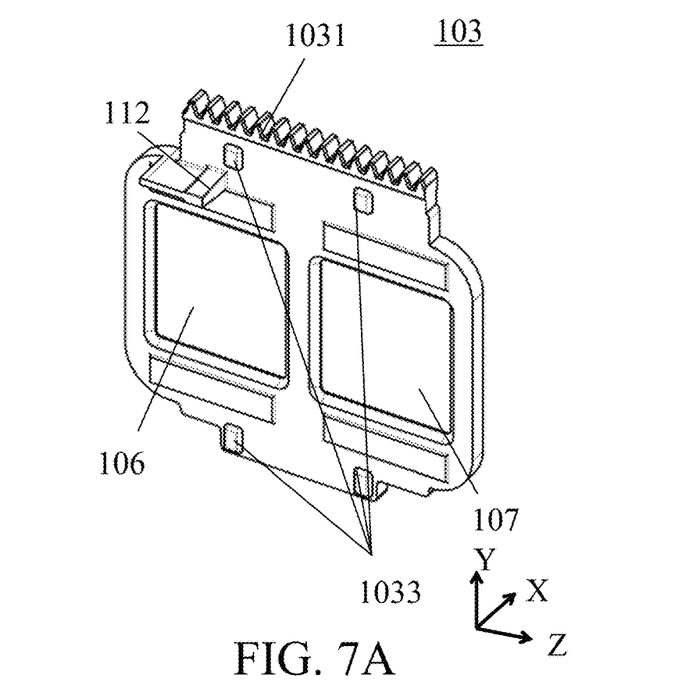
FIG. 7A is a perspective view of a filter holder 103 viewed from the −X direction.
Figure 7B:
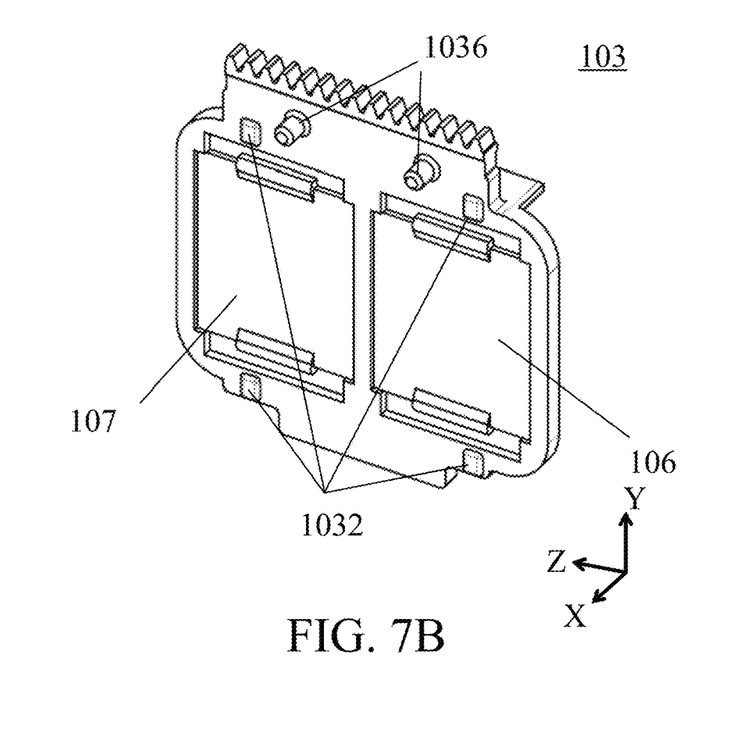
FIG. 7B is a perspective view of the filter holder 103 viewed from the +X direction.

FIG. 7A is a perspective view of the filter holder 103 viewed from the −X direction, and FIG. 7B is a perspective view of the filter holder 103 viewed from the +X direction. The filter holder 103 holds the IRCF 106 (optical element) and a glass 107 (optical element). The filter holder 103 can be inserted into and removed from the optical path slidably in the Z direction by the actuator 105. The IRCF 106, for example, is disposed on the optical axis 11 when a sufficient light amount for the image sensor 5 can be secured, and is retracted from the optical axis 11 when a sufficient light amount for the image sensor 5 cannot be secured. The glass 107 plays a role of preventing a focal position from being changed when the IRCF 106 is retracted from the optical axis 11, particularly in a case where the lens barrel is a fixed-focus lens.

The filter holder 103 is provided with a plurality of sliding surfaces 1032 and a plurality of sliding surfaces 1033 (second sliding portions). The filter holder 103 has a guide portion 1036 and the gear meshing portion 1031. The sliding surface 1022 of the filter base 102 and the sliding surface 1032 slide with each other, and the guide portion 1036 engages with the guide portion 1026 of the filter base 102. Thereby, the sliding of the filter holder 103 is restricted in the Z direction.

Figure 8A:
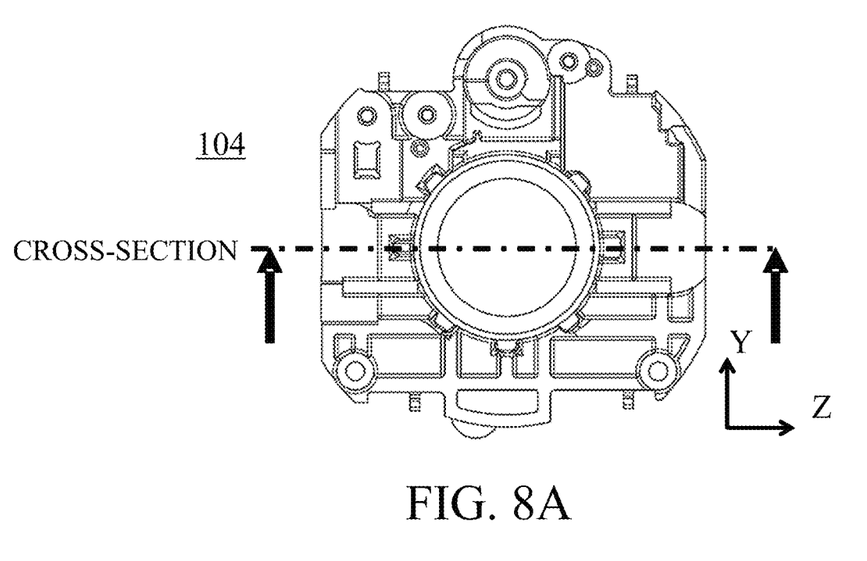
FIG. 8A is an external view of a lens holder 104 viewed from the −X direction.
Figure 8B:
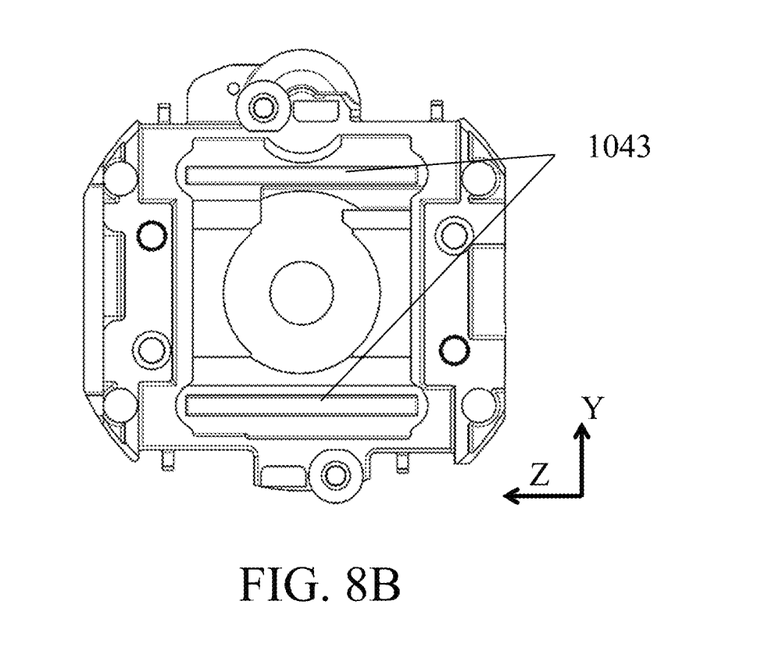
FIG. 8B is an external view of the lens holder 104 viewed from the +X direction.
Figure 8C:
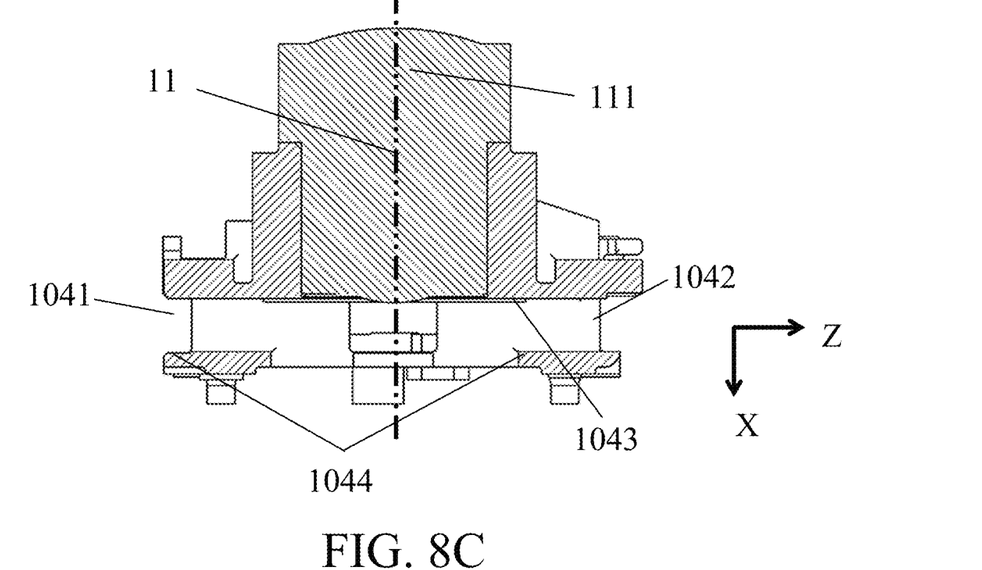
FIG. 8C is a cross-sectional view of the lens holder 104 viewed from a −Y direction on a plane including an optical axis 11 indicated by a dotted line in FIG. 8A.
Figure 8D:
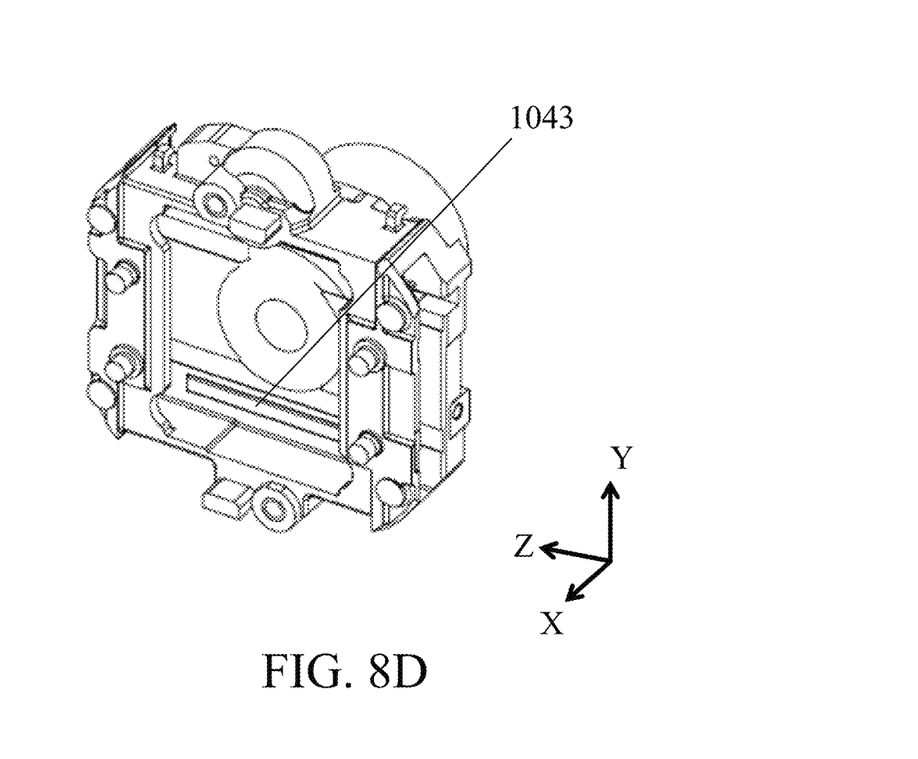
FIG. 8D is a perspective view of the lens holder 104 from the +X direction.

FIG. 8A is an external view of the lens holder 104 viewed from the −X direction, and FIG. 8B is an external view of the lens holder 104 viewed from the +X direction. FIG. 8C is a cross-sectional view of the lens holder 104 viewed from the −Y direction on a plane including the optical axis 11 indicated by a dotted line in FIG. 8A, and FIG. 8D is a perspective view of the lens holder 104 viewed from the +X direction.

The lens holder 104 holds a lens 111 (image-capturing lens). The lens holder 104 is provided with opening portions 1041 and 1042, sliding surfaces 1043 (first sliding portions), and contacting surfaces 1044 (first contacting portions). The opening portions 1041 and 1042 are provided to penetrate the lens holder 104 in a direction orthogonal to the optical axis of the lens 111. The sliding surfaces 1043 are provided on an optical axis orthogonal plane (first orthogonal plane) on a side of the lens 111 in a space inside the lens holder 104 formed through the opening portions 1041 and 1042. The contacting surfaces 1044 are provided on a second orthogonal plane that is an optical axis orthogonal plane that faces the first orthogonal plane in the space. Here, the lens 111 is fixed to the lens holder 104, but a mount portion for attaching a detachable interchangeable lens may be provided in the lens holder 104. The lens 111 has an optical axis 11.

Next, a procedure for incorporating the filter base 102 and the filter holder 103 into the lens holder 104 will be described. Here, as described above, we will make explanations on the basis that in the incorporated state, the sliding surface 1022 of the filter base 102 contacts the sliding surface 1032 of the filter holder 103, and the guide portion 1026 of the filter base 102 contacts the guide portion 1036 of the filter holder 103.

Figure 9A:
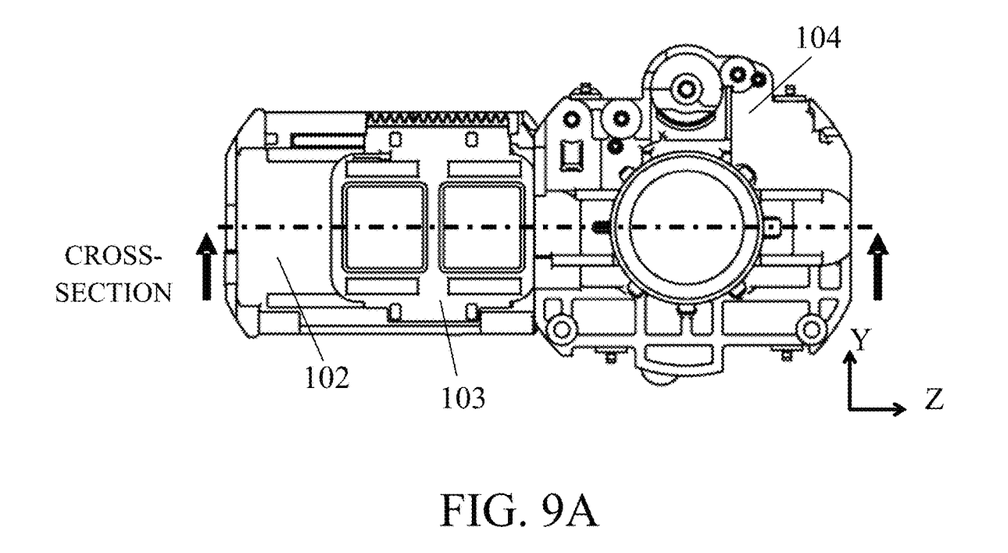
FIG. 9A is an external view of the filter base 102 and the lens holder 104 viewed from the −X direction in a first state.
Figure 9B:
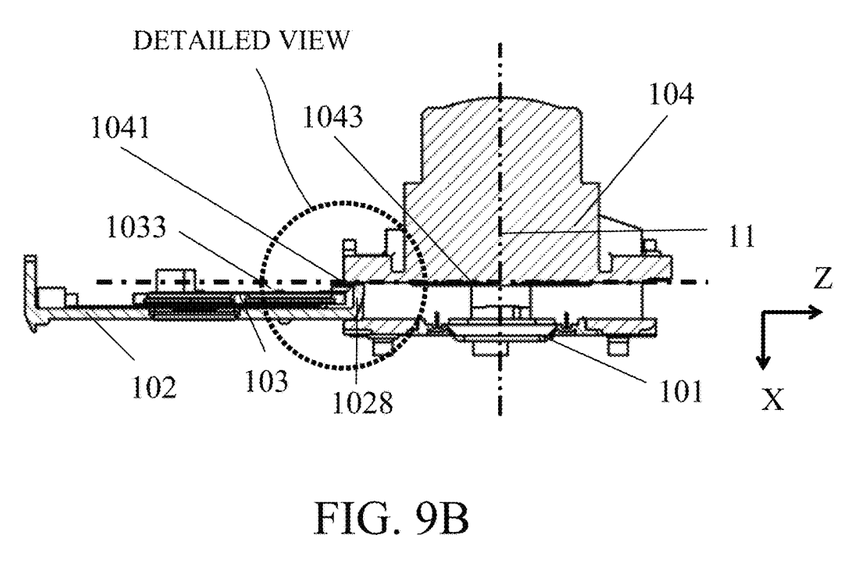
FIG. 9B is a cross-sectional view of the filter base 102 and the lens holder 104 viewed from the −Y direction on a plane including the optical axis 11 indicated by a dotted line in FIG. 9A in the first state.
Figure 9C:
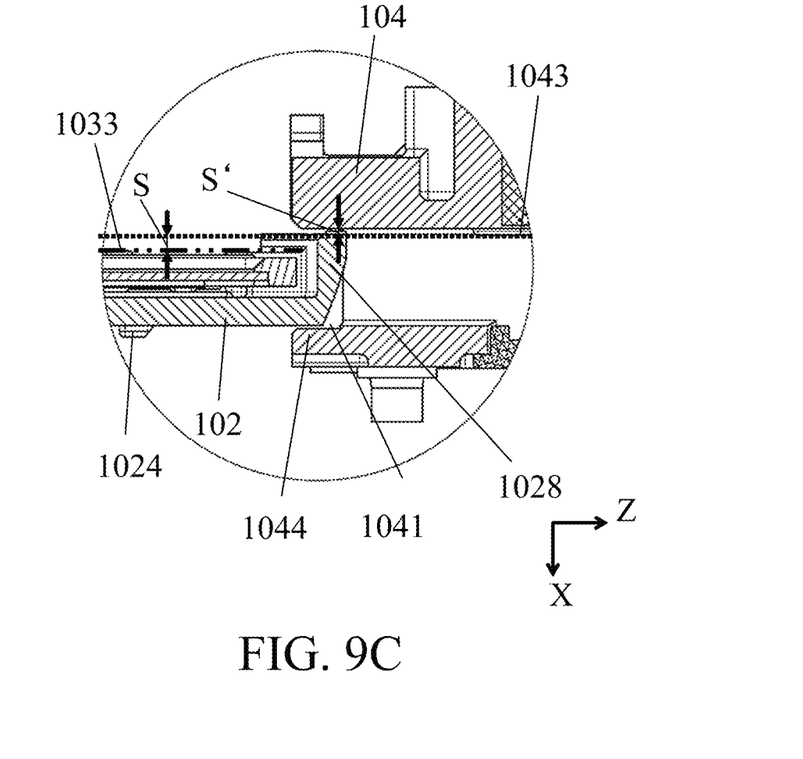
FIG. 9C is a detailed view of a vicinity of a side wall 1028 indicated by a dotted line in FIG. 9B in the first state.

FIG. 9A is an external view of the filter base 102 and the lens holder 104 viewed from the −X direction in a first state in which the filter base 102 is incorporated into the lens holder 104, and FIG. 9B is a cross-sectional view of the filter base 102 and the lens holder 104 viewed from the −Y direction on a plane including the optical axis 11 indicated by a dotted line in FIG. 9A. FIG. 9C is a detailed view of a vicinity of the side wall 1028 indicated by a dotted line in FIG. 9B.

Figure 10A:
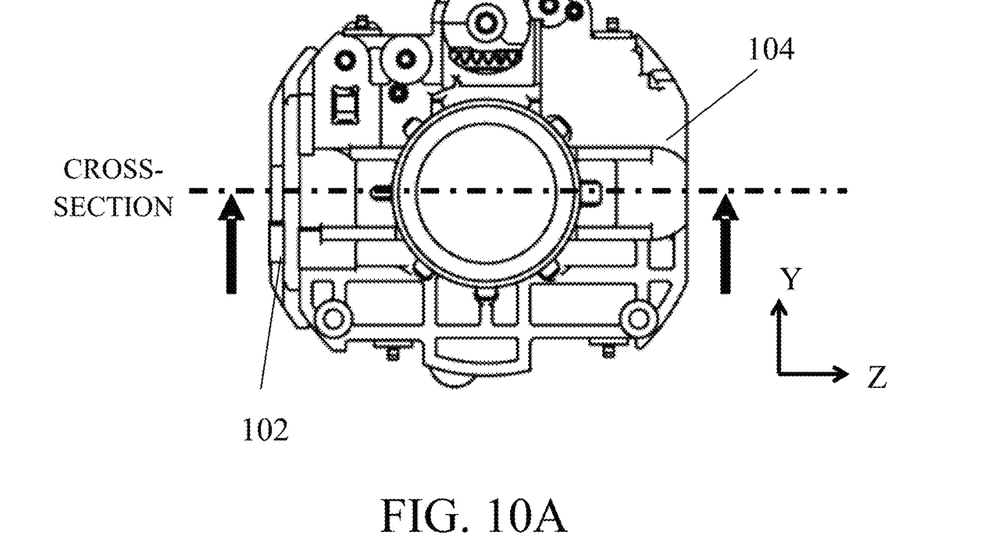
FIG. 10A is an external view of the filter base 102 and the lens holder 104 viewed from the −X direction in the first state immediately before transition to a second state.
Figure 10B:
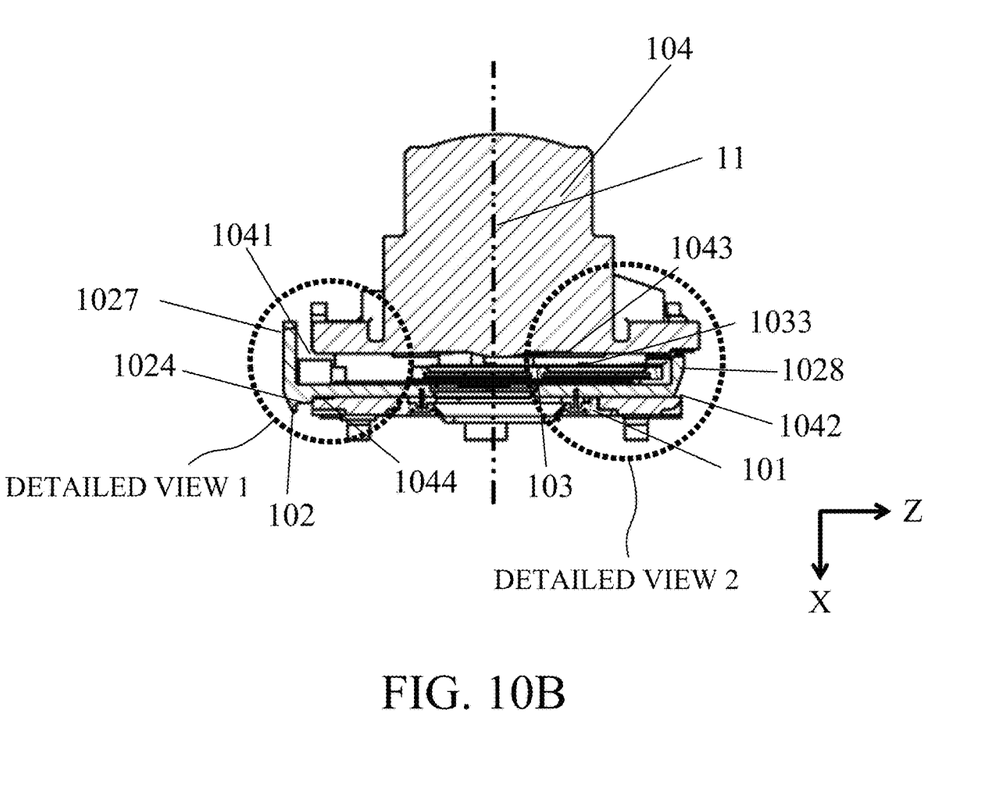
FIG. 10B is a cross-sectional view of the filter base 102 and the lens holder 104 viewed from the −Y direction on a plane including the optical axis 11 indicated by the dotted line in FIG. 10A in the first state immediately before transition to the second state.
Figure 10C:
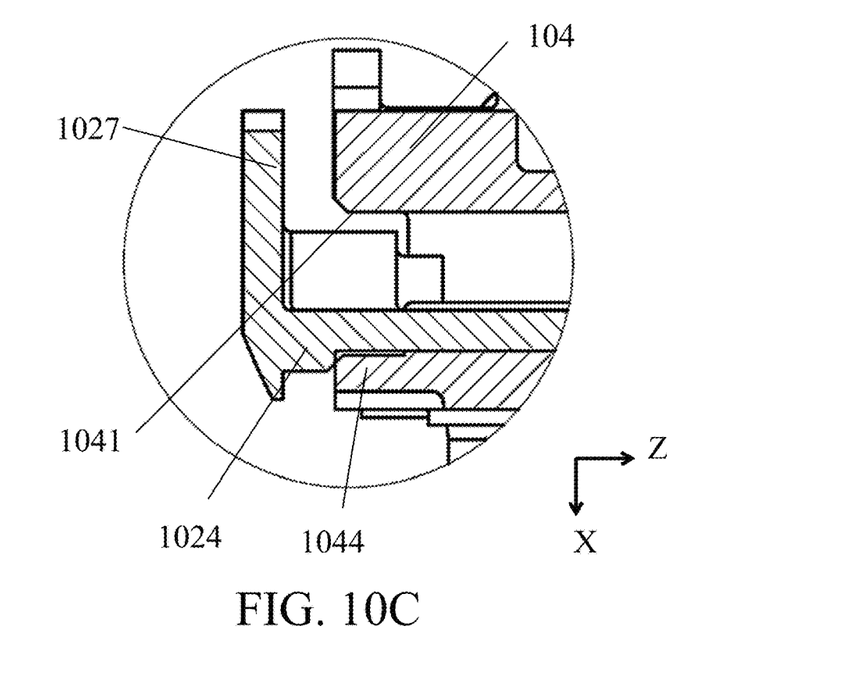
FIG. 10C is a detailed view of a vicinity of an opening portion 1041 indicated by a dotted line in FIG. 10B in the first state immediately before transition to the second state (detailed view 1).
Figure 10D:
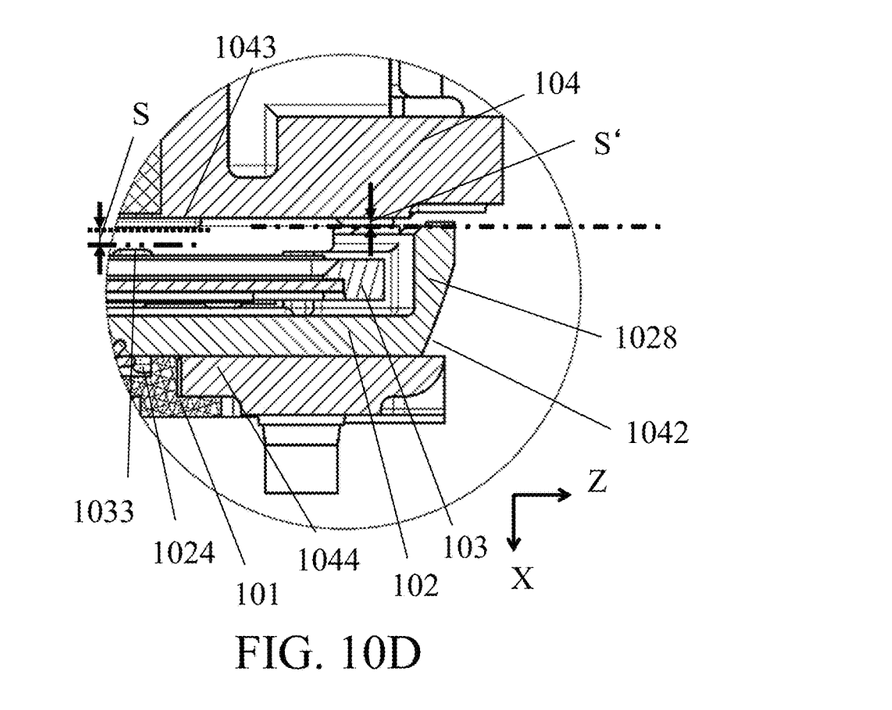
FIG. 10D is a detailed view of a vicinity of an opening portion 1042 indicated by a dotted line in FIG. 10B in the first state immediately before transition to the second state (detailed view 2).

FIG. 10A is an external view of the filter base 102 and the lens holder 104 viewed from the −X direction in the first state immediately before transitioning to a second state in which the incorporation of the lens holder 104 into the filter base 102 is completed, FIG. 10B is a cross-sectional view of the filter base 102 and the lens holder 104 viewed from the −Y direction on a plane including the optical axis 11 indicated by a dotted line in FIG. 10A. FIG. 10C is a detailed view (detailed view 1) of a vicinity of the opening portion 1041 indicated by a dotted line in FIG. 10B, and FIG. 10D is a detailed view (detailed view 2) of a vicinity of the opening portion 1042 indicated by a dotted line in FIG. 10B.

Figure 11A:
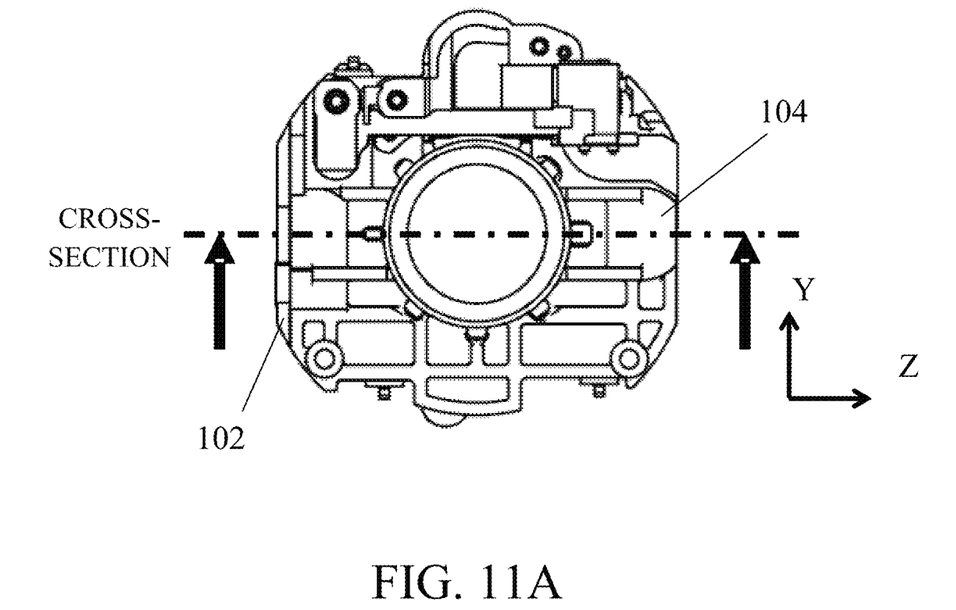
FIG. 11A is an external view of the filter base 102 and the lens holder 104 viewed from the −X direction in the second state.
Figure 11B:
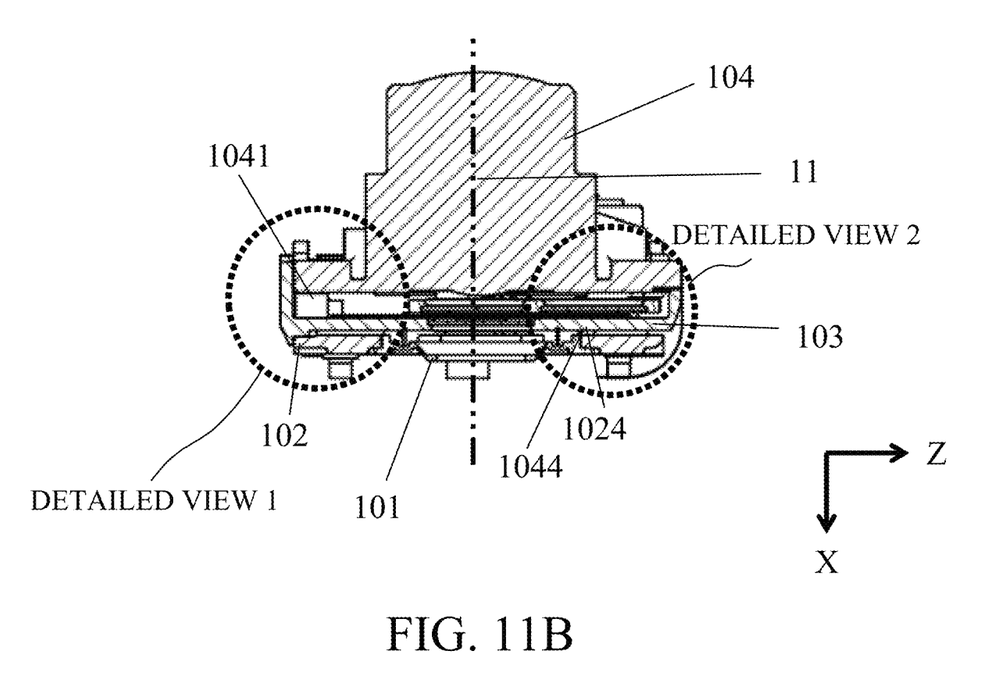
FIG. 11B is a cross-sectional view of the filter base 102 and the lens holder 104 viewed from the −Y direction on a plane including the optical axis 11 indicated by a dotted line in FIG. 11A in the second state.
Figure 11C:
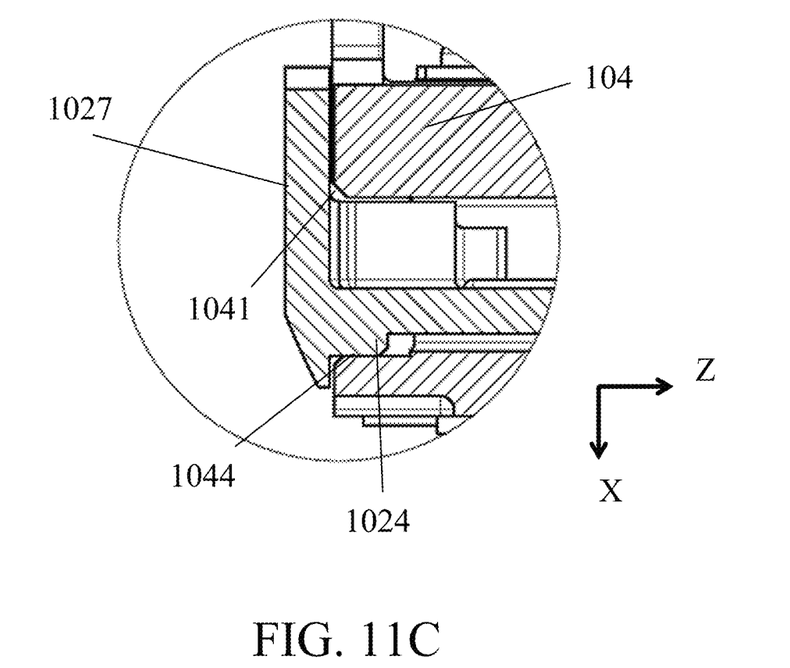
FIG. 11C is a detailed view of a vicinity of the opening portion 1041 indicated by a dotted line in FIG. 11B in the second state (detailed view 1).
Figure 11D:
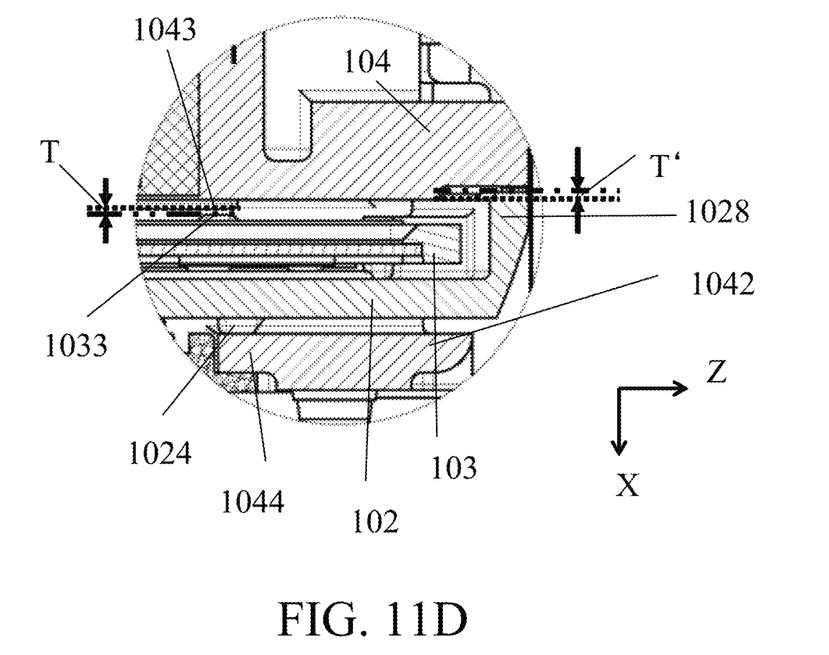
FIG. 11D is a detailed view of a vicinity of the opening portion 1042 indicated by a dotted line in FIG. 11B in the second state (detailed view 2).

FIG. 11A is an external view of the filter base 102 and the lens holder 104 viewed from the −X direction in the second state, and FIG. 11B is a cross-sectional view of the filter base 102 and the lens holder 104 viewed from the −Y direction on a plane including the optical axis 11 indicated by a dotted line in FIG. 11A. FIG. 11C is a detailed view (detailed view 1) of a vicinity of the opening portion 1041 indicated by a dotted line in FIG. 11B, and FIG. 11D is a detailed view (detailed view 2) of a vicinity of the opening portion 1042 indicated by a dotted line in FIG. 11B.

As illustrated in FIGS. 9A-9C, the filter base 102 is incorporated inside the lens holder 104 through the opening portion 1041 of the lens holder 104 from the −Z direction with the filter holder 103 placed on the filter base 102 (first state). At this time, there is a gap S between the sliding surface 1033 of the filter holder 103 and the sliding surface 1043 of the lens holder 104, there is a gap S' between the filter base 102 and the lens holder 104, and S>S'. Note that in FIGS. 9A-9C, S>S', but the embodiment is not limited to this. Further, the contacting surface 1024 of the filter base 102 and the contacting surface 1044 of the lens holder 104 are not in contact, and there is a space between the opening portion 1041 of the lens holder 104 and the side wall 1027 of the filter base 102.

FIGS. 10A-10D are views of the first state immediately before the completion of the incorporation (the second state) illustrated in FIGS. 11A-11D, and gaps S and S' are provided as in FIGS. 9A-9C. At this time, the contacting surface 1024 of the filter base 102 and the contacting surface 1044 of the lens holder 104 have not yet been in contact, there is a space between the opening portion 1041 of the lens holder 104 and the side wall 1027 of the filter holder 102, and there is a space between the opening portion 1042 of the lens holder 104 and the side wall 1028 of the filter holder 102 (first state). Lengths of the opening portions 1041 and 1042 in the optical axis direction may be designed to be longer than a length of the filter base 102 in the optical axis direction excluding the side wall 1027 and the contacting surface 1024.

In FIGS. 11A-11D, the contacting surface 1024 of the filter base 102 and the contacting surface 1044 of the lens holder 104 are in contact with each other, so that the gaps S and S' in the first state in the process of the incorporation are chinked, and these gaps become gaps T and T' in the second state, which are smaller than the gaps S and S' (or an arrangement of the filter base 102 and the lens holder 104 in the X direction is reversed). At this time, S>T and S'>T'. (In the case where the arrangement of the filter base 102 and the lens holder 104 in the X direction is reversed, signs of the gaps T and T' become minus.) The sliding surface 1033 of the filter holder 103 slidably contacts the sliding surface 1043 of the lens holder 104, and the filter base 102 contacts the lens holder 104 so as to be firmly fixed. As a result, because the lens holder 104 also functions as a lid member by sandwiching the filter holder 103 with the filter base 102, the number of components of the optical element switching unit can be reduced, and the thickness can be reduced in a direction of the optical axis 11.

In addition, S>T, and the sliding surface 1033 of the filter holder 103 and the sliding surface 1043 of the lens holder 104 slidably contact with each other, so that rattling during the sliding can be reduced.

Because the contacting surface 1024 of the filter base 102 and the contacting surface 1044 of the lens holder 104 contact with each other, rattling of the filter base 102 with respect to the lens holder 104 can be reduced.

The gaps between the side walls 1027, 1028 on the outer peripheral surface of the filter base 102 and the opening portions 1041, 1042 of the lens holder 104 becomes substantially zero when the incorporation is completed, so that dust can be prevented from entering from outside and light incident inside can be reduced.

At this time, since the opening portions 1041 and 1042 of the lens holder 104 penetrate, the shape is formed in consideration of moldability.

<Other Modifications>

As described above, the embodiment of the present invention has been described. However, the above description does not limit the present invention, and various modifications including deletion, addition, and replacement of components can be considered within the technical scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-090883, filed on May 13, 2019, Japanese Patent Application No. 2019-074542, filed on Apr. 10, 2019, Japanese Patent Application No. 2019-098375, filed on May 27, 2019, and Japanese Patent Application No. 2019-163542, filed on Sep. 9, 2019, which are hereby incorporated by reference herein in their entirety.

What is claimed is:

1. An image-capturing apparatus comprising:
a fixed portion fixing an image-capturing lens and, forming an opening portion on its side surface; and
a holding base holding an optical element holding frame which holds an optical element and is inserted through the opening portion in a direction orthogonal to an optical axis of the image-capturing lens,
wherein the optical element holding frame is sandwiched between the holding base and a surface in the opening portion of the fixed portion,
wherein the fixed portion includes a first sliding portion and a first contacting portion in the opening portion,
wherein the optical element holding frame includes a second sliding portion which slidably contacts the first sliding portion,
wherein the holding base includes a second contacting portion which contacts the first contacting portion, and
wherein the first sliding portion slidably contacts the second sliding portion when the first contacting portion and the second contacting portion are in contact with each other.

2. The image-capturing apparatus according to claim 1, wherein a plurality of the first sliding portions and a plurality of the second sliding portions are provided.

3. The image-capturing apparatus according to claim 1, wherein the holding base has a side wall that fills the opening portion on the side surface.

4. The image-capturing apparatus according to claim 1, wherein the opening portion is provided to penetrate the fixed portion in a direction orthogonal to the optical axis.

5. The image-capturing apparatus according to claim 1, wherein
the surface on a side of the image-capturing lens in the opening portion is a first orthogonal surface which is orthogonal to the optical axis, and
the first sliding portion is provided on the first orthogonal surface.

6. The image-capturing apparatus according to claim 5, wherein
the surface facing the first orthogonal surface in the opening portion is a second orthogonal surface, and
the first contacting portion on the second orthogonal surface.

7. The image-capturing apparatus according to claim 6, wherein a plurality of the first contacting portions and a plurality of the second contacting portions are provided.

8. The image-capturing apparatus, according to claim 6, wherein
the holding base has a side wall that fills the opening portion on the side surface, and
in a direction of the optical axis, a length of the holding base excluding the side wall and the second contacting portion is shorter than that of the opening portion and in a direction of the optical axis, a length of the holding base including the second contacting portion is substantially equal to that of the opening portion.

* * * * *